Sept. 13, 1932.  F. W. OPP  1,876,737
APPARATUS FOR RAY TREATMENT OF VEGETATION
Filed Feb. 25, 1929  2 Sheets-Sheet 2
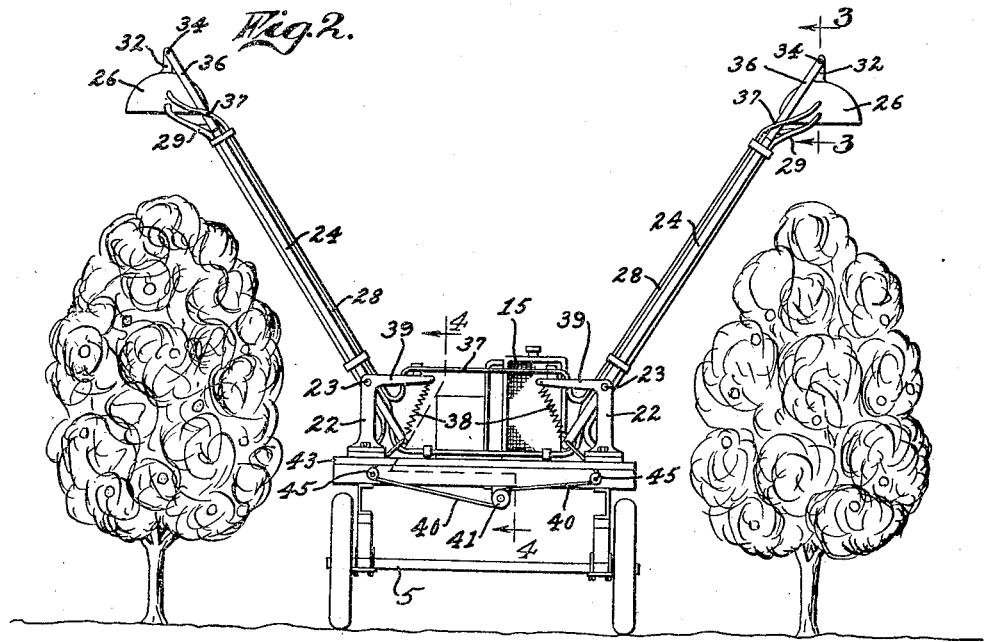
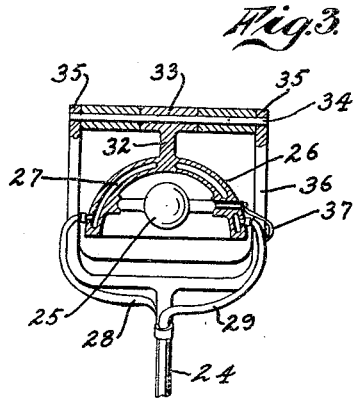
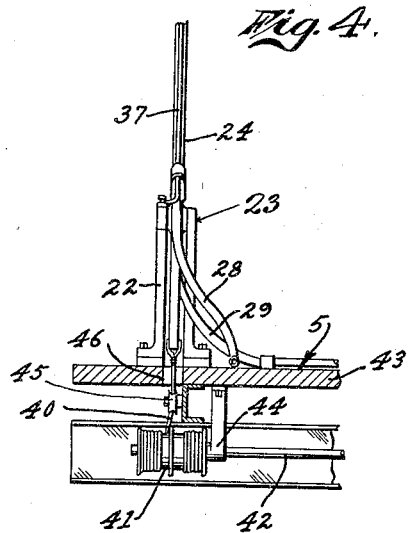
Inventor
Fred W. Opp.
By Lyon & Lyon
Attorneys Patented Sept. 13, 1932

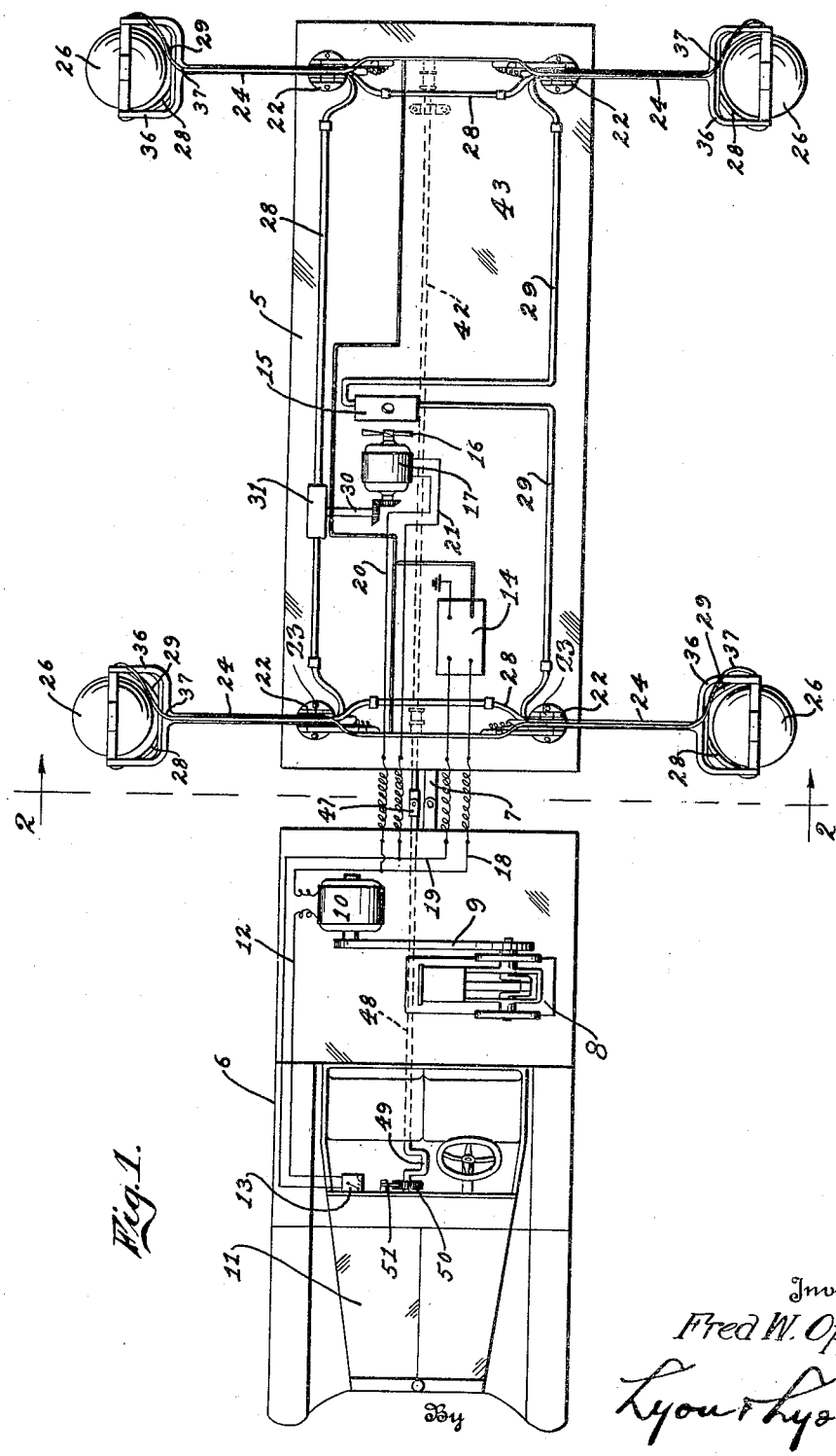

1,876,737

UNITED STATES PATENT OFFICE

FRED W. OPP, OF COSTA MESA, CALIFORNIA, ASSIGNOR OF ONE-HALF TO W. C. COLLINS, OF SANTA ANA, CALIFORNIA

APPARATUS FOR RAY TREATMENT OF VEGETATION

Application filed February 25, 1929. Serial No. 342,530.

This invention relates to apparatus for ray treatment of vegetation, and an object of the invention, in general, is to provide in a portable apparatus all of the essentials for treating vegetation with rays that destroy parasitic life, whether it be on the leaves, branches, trunks or the fruit borne by the trees.

Another object of the invention is simplicity of construction and operation.

Another object is to provide a self-contained unit having a number of ray producing elements that can be used simultaneously for the treatment of different trees or different portions of the same tree.

Other objects and advantages will appear in the subjoined detailed description.

The accompanying drawings illustrate the invention.

Figure 1 is a plan view of an apparatus constructed in accordance with the provisions of this invention.

Figure 2 is an elevation of Figure 1 from the line indicated by 2—2, trees being indicated in position for receiving ray treatment.

Figure 3 is an enlarged vertical section on the line indicated by 3—3, Figure 2.

Figure 4 is an enlarged sectional view on the irregular line indicated by 4—4, Figure 2.

Referring to the drawings, there is provided a wheeled vehicle 5, in this instance in the form of a trailer adapted to be drawn by a motor truck 6. The draft device for connecting the trailer 5 to the motor truck 6 is indicated at 7 and it may be of any suitable construction, well understood in the art relating to such devices. On the motor truck 6 is mounted a prime mover 8 which, in this instance, is illustrated as an internal combustion engine. This engine operates, through driving connections 9, an electric generator 10. The motor for driving the truck 6 is hidden from view, as it is beneath the hood 11. The generator 10 is connected by a wire 12 to a switch 13 positioned on the instrument board of the truck so as to be readily accessible from the truck operator's seat.

Positioned on the trailer 5 is a transformer 14 for changing the low tension current of the generator 10 into a high tension current. Also mounted on the trailer is a radiator 15 through which air is forced by a fan 16 driven by a motor 17. The transformer 14 is connected by a wire 18 to one pole of the generator 10 and is connected by another wire 19 to the switch 13. Thus the low tension current is supplied to the transformer 14 when the switch 13 is closed. The motor 17 is connected by wires 20, 21 to the wires 18, 19, respectively, so as to supply low tension current from the generator 10 to said motor 17.

Mounted on the trailer, in this instance near the four corners thereof, are standards 22 on each of which is pivotally mounted at 23 an arm 24 from the upper end of which is suspended a ray producing element 25 such, for example, as an X-ray tube. The ray producing units 25 may be suitably cooled and, for this purpose, the tubes 25 are mounted in water cooled shields 26 provided with passages 27. The opposite ends of the passages 27 are connected by tubings 28, 29 to the radiator 15 so that the cooling liquid will circulate through the radiator and through the shields 26. The motor 17 may drive, through driving connections 30, a pump 31 in the tubing line 28, so that a forced circulation of cooling fluid may be effected.

In this particular instance, the suspension of the ray producing units 25 is accomplished by providing each of the shields 26 with an upwardly extending stem 32 provided with a transverse hole 33 through which passes a pivot pin 34 that is mounted, at its opposite ends, in bearings 35 of a fork 36 that straddles the shield 26. Thus, gravity will tend to hold the shields 26 in horizontal position regardless of the angle at which the arms 24 are adjusted.

The ray producing elements 25 are connected by wiring 37 to the transformer 14 so as to supply a high tension current from the transformer to said elements.

This wiring 37 extends from the high tension terminal of the transformer 14 to the front and rear ends of the trailer as shown in Figure 1. At each end of the trailer the wiring 37 divides as shown in Figure 2, a lead extending up each arm 24 to the ray-producing element 25 on the end of that arm.

Preferably, the lower ends of the arms 24, which in reality constitute levers, are connected by coil springs 38 to arms 39 projecting substantially horizontally from the upper ends of the standards 22. The springs 38, at least in part, counter-balance the portions of the arms 24 that extend above their pivots 23, together with the elements suspended from the upper ends of said arms.

The arms 24 may be adjusted to different angles, so as to raise and lower the ray producing elements, by any suitable means and, in this instance, such means comprises a cable 40 connected to the lower end of each arm. The cables 40 for oppositely positioned arms 24 are wound on a drum 41. The drum 41, of which there are two in this instance, are mounted on a shaft 42 that extends longitudinally beneath the trailer platform 43 and is suspended in bearings 44 secured to the under surface of the platform 43. Each cable passes around a pulley 45 that is rotatably mounted on the trailer, as clearly seen in Figure 4, and each of the cables 40 passes on its way from the pulley 45 to the arm 24 through an opening 46 in the trailer platform 43. The shaft 42 is in two sections and the forward end of the rear section is coupled, by a coupling 47, to a forward section 48 which is provided, at a point adjacent to the truck driver's seat, with a crank 49 whereby the shaft 42 may be turned. The shaft section 48 is provided with a ratchet wheel 50 adapted to be engaged by a pawl 51 so as to hold the shaft 42 in the position to which it has been turned, thus to hold the arms 24 at any desired angle.

The invention operates as follows: The truck with its attached trailer is driven into an orchard between the rows of trees into position to suspend the ray producing elements 25 as nearly as possible over the centers of the adjacent trees. The engine 8 will then be started into operation, so as to produce a high tension current. The operator will then close the switch 13, thus supplying the high tension current to the ray producing elements. The water circulating in proximity to the ray producing elements prevents overheating of the same and the radiator 15 is maintained at a desirable temperature by operation of the motor 17.

After a specified interval of time, the operator will open the switch 13 and drive the truck and its trailer along the row of trees so as to bring the ray producing elements over the trees next adjacent to those already treated and he will then close the switch. Thus the apparatus will be driven between the different rows of trees in the orchard, stopping a sufficient length of time to treat each tree with the rays, until all of the trees in the orchard have been treated. The length of time of the treatment will depend upon the variety of parasitic life that is to be destroyed and the size of the tree. If the tree is a very large one, the arms 24 may be adjusted to different positions so as to first treat the upper portion of the tree and then the lower portions.

I am aware that the use of electric rays for treating vegetation is not new, but I am not aware that an apparatus has been invented for conveniently treating the trees in an orchard.

I claim:

An apparatus for ray treating vegetation comprising a wheeled support, standards mounted on said support, an arm pivoted to each of said standards and extending upwardly and outwardly whereby arms on opposite sides of said support present their upper ends adjacent growing plants in rows located on opposite sides of the wheeled support, a ray producing element carried by each of said arms, a means on the support to adjust the arms to different inclinations and a means to supply a high tension electric current to the ray producing elements.

Signed at Costa Mesa, Calif., this 16th day of January, 1929.

FRED W. OPP.